Sept. 24, 1940.    S. ANDERSON ET AL    2,215,493
PRUNING IMPLEMENT
Filed Dec. 31, 1938
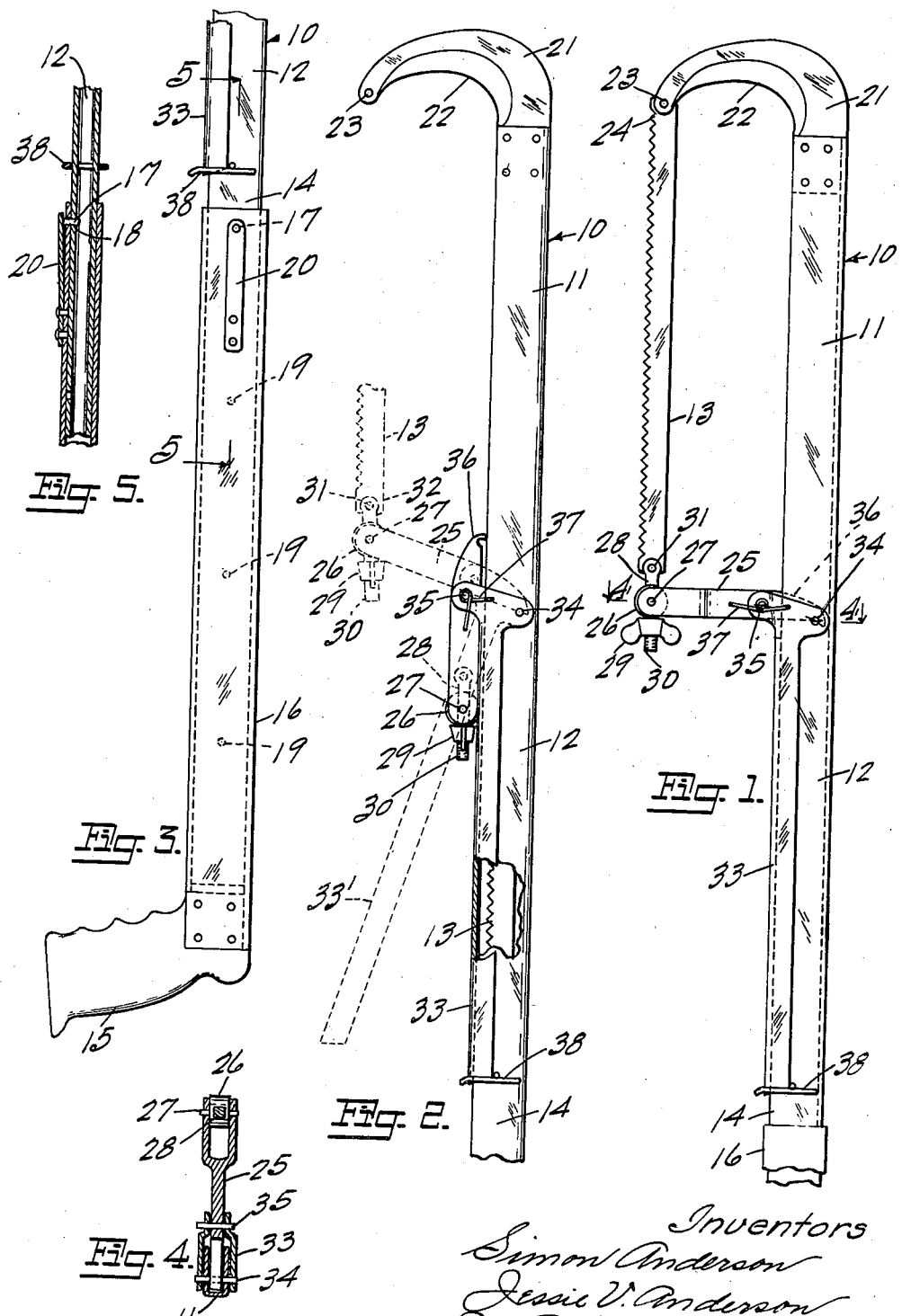

Patented Sept. 24, 1940

2,215,493

UNITED STATES PATENT OFFICE 2,215,493

PRUNING IMPLEMENT

Simon Anderson and Jessie V. Anderson, Richmond, Calif.

Application December 31, 1938, Serial No. 248,704

7 Claims. (Cl. 30—144)

This invention, a pruning element, is specifically designed for the convenient and efficient pruning of trees and shrubs, and combines in a single instrument, a pruning or brush hook, and a saw which is removable and replaceable with a minimum of effort and including storage space for the saw blade when not in use, the instrument being of the simplest possible construction conformable with practicability, facility and efficiency.

Many different types of pruning devices have been advanced, some of which include several different instruments in a single implement, such as pruning shears, guillotines, saws, knives, pruning and brush hooks.

In such implements, either the various elements making up the combination introduce obstructions against the efficient or convenient use of the other elements, or, due to their specific structure, are impractical, or too weak to function in the manner intended, such as the combination of a saw blade having a pruning hook formed at and extending from the terminal end, which combination, due to the limited practical thickness of the blade, cannot permit proper functioning of the hook in view of lack of torsional resistance which permits undue twisting of the blade attended with consequent cocking of the hook, making the hook ineffective except for clipping the smallest twigs.

In this invention, a very simple, non-obstructional combination is provided and which operates with highest efficiency, and which is of the most convenient form for use, and in which either element may be used at will without hindrance from the other element, and which may be used interchangeably as a pruning hook for cutting off twigs, shoots, and branches of comparatively small cross-section, and, as a saw for sawing off larger branches, and in which the handle may be extended at will to increase the reach.

The objects and advantages of this invention are:

First, to provide a pruning implement combining two essential cutting elements and comprising a pruning or brush hook, and a quickly and conveniently removable and replaceable sawing element.

Second, to provide an implement as outlined with mounting means for a saw blade, in the form of a frame of rigid construction, the head member of which frame is sharpened on its inner edge and arcuately formed to form a pruning hook, and which hook is provided at its outer terminal end with saw blade holding or securing means, the head member being thereby duo-functional.

Third, to provide an implement as outlined in which the lower member of the saw frame is retractable to a position in non-obstructional relation to the hook.

Fourth, to provide an implement as outlined in which the frame is provided with a long handle-extension, and preferably in which said extension is extensible and retractable at will for convenient control of the reach of the implement.

Fifth, to provide an implement as outlined with a quick-acting lever for control of the lower member of the saw frame for tensioning and locking the saw blade in position, and to provide latching means for the lever, and to make the latching means self-acting.

Sixth, to provide an implement as outlined with a magazine for saw blades, and to utilize the control lever for the lower saw-frame member as a closure for the magazine and retainer for the blades when not in use, thereby providing dual function for this lever.

Seventh, to provide an implement of the type outlined which is convenient to use, extensible as to requirements of reach, non-obstructionable, facile, and economical in construction, and efficient in operation.

In describing this invention, reference will be had to the accompanying drawing, in which:

Fig. 1 is a side elevation of the invention, with the handle extension broken away, and with the saw blade mounted for sawing operations.

Fig. 2 is a side elevation similar to Fig. 1 except that the saw blade is removed from the frame and stored in the magazine.

Fig. 3 is a side elevation of the preferred form of handle extension as broken away from Fig. 1.

Fig. 4 is a section taken on line 4—4 of Fig. 1 but arranged at right angles to the view of Fig. 1.

Fig. 5 is a section taken on line 5—5 of Fig. 3.

The invention consists of a member 10 which is U-shaped in cross-section and comprising in series within its length, a back 11 for the saw frame, a magazine 12 for the saw blades 13, and a handle extension 14 which terminates in a handle 15 with reference to Fig. 2.

In connection with Figs. 1 and 3, a second handle extension 16 is telescopically associated with the extension 14, and the handle 15 is attached to the end thereof.

The second extension 16 is provided with a pin 17 which passes through a hole 18 formed through the side wall of the telescoping member 16, and is located in registrable relation to the holes 19 which are formed in the telescoped member or extension 14, and a leaf spring 20 urges the pin 17 to cooperate to lock the two extension members 16 and 14 in adjusted position to vary the reach of the implement, thus providing an implement which can be adjusted for long or short reach at will.

To change the adjustment of the length of the handle it is merely necessary to lift up on the end of the spring 20 and extend or contract the handle to the length desired and then permit the pin 17 to engage the closest hole 19.

A pruning hook 21 is fixedly secured to the upper end of the member 10 and is preferably arcuately formed as shown, and sharpened at its under or inner edge 22 as indicated, to form a cutter, or pruning or brush hook.

A hook element 23 of the usual type used on hack saws is fixed in the outer terminal end of the pruning hook 21 thus forming the upper supporting arm for one end 24 of a saw blade 13; thus this element 21 is duo-functional, combined or selective, since the pruning hook can be used to clip off interfering twigs when the saw is in use, and, the hook can be used alone for function as a pruning hook, or used as the upper supporting arm for a saw blade 13.

The lower saw-blade-supporting arm 25, for cheaper constructions, may be fixedly mounted (not shown) on the back 11, but is preferably constructed as illustrated, in which a sleeve 26 is pivoted transversely in the arm as indicated at 27, an axially adjustable member 28 is slidable in the sleeve and adjustable by means of the thumb or wing nut 29 cooperating with the threaded end 30 of the member 28, the other end having the usual type of saw blade retaining or securing pin or hook 31 for cooperation with the other end 32 of the saw blade 13.

A lever 33 is pivoted at its upper end to the lower end of the saw frame back 11 as indicated at 24, and when in its folded or closed position, this lever forms a cover for the saw blade magazine 12 as is clearly indicated in Fig. 2.

The lower supporting arm 25 is pivotally mounted in the lever 33 as indicated at 35 and has a rearward extension 36 which superposedly engages the pivot pin 34 for the lever 33 forming a stop to limit approachment of the outer end 26 of the arm in the direction of the hook 21, to form a rigid support for the saw blade, this approachment being limited to substantially right angular relation to the face of the lever 33, while the lever 33, when swung to the position 33' increases the degree of approachment for quick interchange or removal or mounting of blades.

A spring 37 urges retraction of the arm and causes it to fold down to a dependent position against the face of the lever 33 when the arm is unsupported by a saw blade, as shown in Fig. 2, thus removing the obstructional or interfering effect of the extended arm (Fig. 1) in the path of the hook 21.

A latch 38 engages the lower end of the lever 33 in its closed position and locks the lever to maintain the tension on the saw blade when mounted, and to secure the blades against loss from the magazine, and this latch may be spring urged or formed of spring material, such as wire indicated.

The magazine 12 provides storage for a plurality of blades. As indicated in Fig. 2, the saw blade is removed and stored in the magazine. The lower arm 25 is in its retracted position and the implement is clear of interfering or obstructional features, providing for efficient use of the puning hook.

When a branch is encountered which is too thick to cut off with the pruning hook, the latch 38 is released and the lever is swung to the dotted position 33', which coincidently makes the blades 13 in the magazine 12 accessible.

A blade 13 is removed from the magazine, one end is hooked onto the pin 31 of the lower arm, the arm is drawn out and up by means of the blade and the other end hooked onto the pin 23 on the upper arm and the blade released. The spring 37 which urges retraction of the arm will tension the blade sufficiently to retain it on the pins. The lever 33 is then pressed back to the position shown in full lines at which point the latch 38 snaps over the end of the lever, locking it in its closed position. Thus the mounting and dismounting, and the storage of blades is a single handed operation and accomplished with a minimum of time and effort.

The thumb or wing nut 29 should quite tightly fit the threaded end 30 so as to maintain its adjustment and not tend to work loose, and when once suitably adjusted, the lever 33 will coincidently tension the blade and close the magazine to prevent loss of blades.

While this blade is mounted, the pruning hook can still be used to clear away twigs over which it can be conveniently slipped, therefore the pruning hook and saw are coincidently available.

When the saw is no longer required, and the pruning hook alone is to be used, the lever 33 is moved to the position shown by dotted lines at 33', the blade is removed and placed in the magazine and the lever closed. The mounting and removal of blades is therefore consummated with the minimum expenditure of time and effort and is a single handed operation, and in case of breakage of a blade, or its becoming dulled, an additional blade is always available.

It will be understood that variations and changes in construction and arrangement of the various elements, which variations are consistent with the appended claims, may be resorted to without detracting from the spirit or scope of the invention, or sacrificing any of the advantages thereof.

I claim:

1. A pruning implement, in combination, a frame having a back terminating at one end in a combined pruning hook and upper supporting arm incorporating securing means for one end of a saw blade; a lower supporting arm at the other end of the back and incorporating adjustable securing means for the other end of the saw blade; said combined pruning hook and upper supporting arm being internally arcuately formed and sharpened to a cutting edge to form the pruning hook, a handle extension for said frame, a lever pivotally associated at its upper end with said frame; said lower supporting arm having its inner end pivotally associated with said lever and being provided with stop means to limit approachment of its outer end toward said pruning hook to a predetermined angle relative to said lever; means associated with said extension and cooperatively related to said lever for locking said lever against said extension at will; means urging retraction of said lower supporting arm to a position against said lever when said supporting arm is unsupported by a saw blade, said lever providing for increasing the degree of approachment to facilitate application and removal of saw blades.

2. A pruning implement, in combination, a frame having a back terminating at one end in a combined pruning hook and upper supporting arm incorporating securing means for one end of a saw blade; a lower supporting arm at the other end of the back and incorporating adjustable securing means for the other end of the saw blade; said combined pruning hook and upper supporting arm being internally arcuately formed and sharpened to a cutting edge to form the pruning hook; a handle extension for said frame; a pivotal mounting on said frame and a lever having one of its ends associated therewith; said lower supporting arm having its inner end pivotally associated with said lever and being provided with stop means to limit approachment of its projecting end in a direction toward said pruning hook; means associated with said extension and cooperatively related to said lever for locking said lever against said extension; means urging retraction of said lower supporting arm to a position against said lever; said lever providing for increased approachment of said lower supporting arm at will to facilitate application and removal of saw blades.

3. A pruning implement comprising a saw frame having a back and upper and lower saw-blade-supporting arms, the upper arm having at its outer end an engaging member for supporting one end of a saw blade, the lower arm having an axially adjustable member for tensioning of a saw blade and provided with an engaging member for supporting the other end of the saw blade, the upper arm having its under edge sharpened to form a cutter, and a handle extension for said frame and a handle for said extension; a lever pivotally associated with said frame; said lower arm having a pivotal connection to said lever and limited to projection upwardly at right angles to said lever to form a rigid support for the saw blade under tension, and a spring normally retaining said lower arm in a dependent position against the face of said lever and out of obstructional relation in the path of said cutter; said lever forming quick-change tensioning means for application of blades to, and removal from, said arms.

4. A pruning implement comprising a frame consisting of a U-shaped member forming in series the back of a saw frame, and a handle extension; a cutting hook mounted at the upper end of said back of said saw frame and projecting outwardly therefrom forming coincidently the upper supporting arm of the saw frame and being sharpened on its under edge to form a cutter, and having retaining means for one end of a saw blade and located at the outer end; a lever having a pivotal connection to the lower portion of the back of the saw frame, and means for securing said lever in closed position against said handle extension; and a lower supporting arm secured to said lever and having at its outer end retaining means for the other end of the saw blade; said lever operating, when moved to open position, to permit quick removal and mounting of blades on said retaining means, and functioning to tension a mounted blade when in closed position.

5. A structure as claimed in claim 4, said lower supporting arm being pivotally connected to said lever; stop means limiting the upward swing of said arm relative to said lever and a spring normally urging folding of said arm downwardly against the face of said lever to remove the obstructional effect thereof in the path of the pruning hook as provided in its projected position.

6. A structure as defined in claim 4; a second handle extension telescopically associated with said handle extension and a handle therefor; and latch means manually releasable at will for locking said handle extensions in any one of a plurality of relative positions for increasing or decreasing the reach of the implement at will.

7. In a pruning device, a saw frame having a back and upper and lower saw-blade-supporting arms, and a handle; a cutting edge formed along the under edge of the upper arm forming a pruning hook; and means associated with said lower arm and manually operable at will providing for quick removal and mounting of saw blades, for conversion of said device to saw or pruning hook, at will and in which said back is formed of an element U-shaped in cross-section and which extends beyond the lower saw-blade-supporting arm to form an extended handle element; said means associated with said lower arm comprising a lever having its upper end pivotally associated with the lower portion of said back and extending downwardly along said handle element, and means for locking said lever in closed position against said handle element; said lower saw-blade-supporting arm being pivotally connected at its inner end to said lever and including stop means limiting the upward swing relative to said lever, and a spring urging said arm down.

SIMON ANDERSON.
JESSIE V. ANDERSON.